United States Patent Office 3,438,915
Patented Apr. 15, 1969

3,438,915
AQUEOUS SURFACE-COATING COMPOSITIONS CONTAINING POLYSACCHARIDE THICKENERS
Theodore A. Girard, Wayne, N.J., assignor, by mesne assignments, to Tenneco Chemicals, Inc., a corporation of Delaware
No Drawing. Filed May 14, 1963, Ser. No. 280,431
Int. Cl. C09d 5/04; C09
U.S. Cl. 260—17.4    4 Claims This invention relates to aqueous dispersions of water-insoluble polymeric materials that are adapted for use as surface-coating compositions. More particularly it relates to the thickening of such aqueous dispersions and to the thickened dispersions thereby obtained.

Aqueous dispersions of water-insoluble synthetic linear polymerse have found widespread use as surface-coating compositions because they form films that have an excellent combination of physical properties, because they are free from the hazards of flammability and solvent toxicity, and because they can be applied over damp surfaces. Thickening agents are generally used in these aqueous dispersions to stabilize them by inhibiting the coalescence or flocculation of the dispersed particles of the resinous binder as well as to bring them to suitable viscosity for application by spray, by brush, or by roller. While a number of thickeners have been suggested for use in these aqueous dispersions, none has proven entirely satisfactory in this application. Some, such as methylcellulose, hydroxyethylcellulose, and treated bentonites, form thickened compositions that often do not have the required flow and leveling properties, while others, such as casein and alginates, have a deleterious effect on the water-resistance and other physical properties of the coating compositions to which they are added.

This invention relates to a new class of thickeners for aqueous dispersions of water-insoluble synthetic linear polymers. These thickeners, which are high molecular weight exocellular polysaccharides, can be added to such aqueous dispersions to form thickened compositions that spread smoothly without sagging or balling and that have excellent flow and leveling characteristics. Unlike most of the previously known thickeners, these polysaccharides are not affected by heat or by the presence of electrolytes, and they do not have a deleterious effect on the physical properties of films formed from the thickened paints.

The polysaccharides that are used in the practice of the present invention are fermentation products produced by the action of certain bacteria and yeasts upon carbohydrates. The organisms that produce these polysaccharides include bacteria of the genus Xanthomonas, bacteria of the genus arthrobacter, and yeasts of the genus cryptococcus. Since they produce polysaccharides that form aqueous solutions that are exceptionally heat stable and that do not become less viscous in the presence of electrolytes, *Xanthomonas campestris* (especially the strain designated as NRRL B-1459, Northern Regional Laboratory Classification), Arthrobacter sp. (NRRL B-1973), and *Cryptococcus laurentii* var. *flavescens* (NRRL Y-1401) are the preferred species. A variety of carbohydrates can be fermented by means of these organisms to produce the polysaccharides. These include glucose, fructose, sucrose, maltose, lactose, galactose, and the like.

As described in bulletins CA-N-9 (September 1959), CA-N-14 (April 1961), and CA-N-21 (May 1962) of the Northern Utilization and Research Division of the U.S. Department of Agriculture, Agricultural Research Service, polysaccharides can be obtained by whole culture fermentation with the aforementioned organisms under aerobic conditions for 4–5 days at 25°–28° C. in a medium containing 2%–6% of glucose, organic nitrogen sources, dibasic potassium phosphate, and trace elements. The fermentation mixture is then centrifuged to remove cells. The polysaccharides are precipitated from the supernatant liquid by methanol in the presence of an electrolyte such as potassium chloride, reprecipitated, and finally dehydrated by treatment with methanol. The recovered products are high molecular weight heteropolysaccharides that are readily soluble in cold water.

The composition of a polysaccharide prepared by the aforementioned procedure is largely dependent upon the organism used in its preparation. For example, the polysaccharide produced by *Xanthomonas campestris* (NRRL B-1459) is made up of D-mannose, D-glucose, D-glucuronic acid (as the potassium salt), and acetyl in the approximately molar ratio of 2:1:1:1; the polysaccharide produced by Arthrobacter sp. (NRRL B-1973) is made up of D-galactose, D-glucose, mannuronic acid (as the potassium salt), and acetyl in the approximately molar ratio of 0.75:0.75:1:1; and the polysaccharide produced by *Cryptococcus laurentii* var. *flavescens* (NRRL Y-1401) is made up of D-mannose, D-xylose, D-glucuronic acid (as the potassium salt), and acetyl in the approximate molar ratio of 4:1:1:1.5. These polysaccharides can be heated at approximately 90° C. preferably in the presence of a small amount of potassium chloride or deactylated by treatment with dilute alkali to form modified polysaccharides that can also be used as thickeners in the compositions of this invention.

The term "Polysaccharide B-1459" will be used herein to designate the polysaccharide produced by the fermentation of glucose by *Xanthomonas campestris* (NRRL B-1459), the term "Polysaccharide B-1973" to designate the polysaccharide produced by the fermentation of glucose by Arthrobacter sp. (NRRL B-1973), and the term "Polysaccharide Y-1401" to designate the polysaccharide produced by the fermentation of glucose by *Cryptococcus laurentii* var. *flavescens* (NRRL Y-1401).

The dispersions that may be thickened by the addition of the polysaccharides to form compositions that are useful as surface coatings are aqueous dispersions that contain a resinous binder that is a water-insoluble synthetic linear addition polymer. Such dispersions are ordinarily prepared by the emulsion polymerization of polymerizable materials, especially those of monoethylenically unsaturated character, although butadiene, chlorobutadiene, and isoprene may be used to some extent. Examples of the polymeric materials that may be used as the resinous binder in the aqueous dispersions are polyvinyl acetate; polyvinyl butyrate; polyvinyl chloride; copolymers of vinyl acetate with vinyl chloride; copolymers of vinyl acetate with acrylonitrile; copolymers of vinyl chloride with acrylonitrile; copolymers of vinyl chloride with vinylidene chloride; polyethylene; polyisobutylene; polystryrene; copolymers of stryrene with butadiene, copolymers of acrylonitrile with butadiene; copolymers of methacrylic acid esters of alcohols having 1 to 8 carbon atoms with vinyl acetate, vinyl chloride, acrylonitrile, or styrene; copolymers of acrylic acid esters of alcohols having 1 to 8 carbon atoms with vinyl acetate, vinyl chloride, acrylonitrile, or styrene; copolymers of the aforementioned acrylic acid esters, the aforementioned methacrylic acid esters, and acrylic acid; and copolymers of styrene with maleic anhydride. Generally the polymer dispersion to be thickened contains from 10% to 60% by weight of one or more of the aforementioned polymers.

Only a small concentration of the polysaccharide is required in the thickened surface-coating compositions of the present invention. It has been found that as little as 0.01% of the polysaccharide, based on the weight of the composition, will bring about appreciable thickening of the aqueous dispersions and that concentrations of approximately 2% or more, based on the weight of the composition, can be used without adversely affecting the flow and leveling properties of the compositions or the water-resistance and other physical properties of films prepared from them. While the amount of polysaccharide that is used in the surface-coating compositions is dependent upon such factors as the viscosity of the aqueous dispersion and the degree of thickness desired in the product, in most cases approximately 0.1% to 1% of polysaccharide, based on the weight of the aqueous surface-coating composition, is used.

Accordingly, this invention provides improved surface-coating compositions that comprise an aqueous dispersion containing 10% to 60% by weight of a water-insoluble linear addition polymeric material, said polymeric material being a polymer obtained by vinyl polymerization of monoethylenically unsaturated molecules, and approximately 0.01% to 2%, and preferably 0.1% to 1%, based on the weight of said composition, of a thickener that is a high molecular weight polysaccharide produced by the fermentation of a carbohydrate by an organism selected from the group consisting of bacteria of the genus Xanthomonas, bacteria of the genus Arthrobacter, and yeasts of the genus Cryptococcus.

In addition to the water-insoluble resinous binder and the thickener, the aqueous surface-coating compositions may contain various auxiliary materials, such as emulsifying agents of the anionic, cationic, or non-ionic type; dispersing agents; plasticizers; pigments, extenders; dyes; defoaming agents; bactericides and/or fungicides; perfume-like materials including neutralizing and masking agents; other resinous materials, such as alkyd resins, drying oils, and natural resins; and corrosion inhibitors. These materials may be present in the amounts ordinarily used for these purposes.

The polysaccharide that is used as the thickener may be incorporated into the surface-coating composition by any convenient procedure. For example, it can be combined with the pigments, extenders, dispersing agents, and other additives to form a pigment phase that is then mixed with water and the aqueous dispersion of the resinous binder to form a thickened surface-coating composition. Alternatively, it can be added to an aqueous dispersion that contains the resinous binder, pigment, and additives. The polysaccharide may be added as such to the components of the novel surface-coating compositions. It is preferably added, however, as an aqueous solution that contains approximately 0.1% to 3% by weight of the polysaccharide.

The invention is further illustrated by the examples that follow:

Example 1

An acrylic emulsion paint was prepared by mixing together the following materials in a pony mixer:

| | Pounds |
|---|---|
| Water | 214.0 |
| Anionic dispersing agent (25% aqueous solution of a sodium salt of a polymeric carboxylic acid) (Tamol 731-25) | 3.0 |
| 10% aqueous solution of polyacrylic acid | 17.5 |
| Phenylmercuric acetate | 9.0 |
| Defoamer (Nuodex AF-7) | 4.5 |
| Talc | 31.0 |
| Titanium dioxide (anatase) | 50.0 |
| Titanium dioxide (rutile) | 125.0 |
| Calcium carbonate | 267.0 |
| 28% ammonia | 1.0 |
| Aqueous dispersion containing 43% by weight of the ammonium salt of a copolymer of about 66% by weight of ethyl acrylate, 32.5% by weight of methyl methacrylate, and 1.5% by weight of acrylic acid containing about 3% by weight of tert. octylphenoxypolyethoxyethanol | 361.0 |
| 2% aqueous solution of Polysaccharide B-1459 | 54.0 |

The resulting thickened paint had excellent flow and leveling characteristics when applied by brush or roller.

Example 2

An acrylic emulsion paint was prepared that had the same composition as that of Example 1 except that 71.7 pounds of a 2% aqueous solution of Polysaccharide B-1973 was used as the thickener. The resulting thickened paint had excellent flow and leveling characteristics when applied by brush or roller.

Example 3

An acrylic emulsion paint was prepared that had the same composition as that of Example 1 except that 92 pounds of a 1.5% aqueous solution of Polysaccharide Y-1401 was used as the thickener. The resulting paint had excellent flow and leveling characteristics.

Example 4

A polyvinyl acetate emulsion paint was prepared by mixing together the following materials in a pony mixer:

| | Pounds |
|---|---|
| Water | 270 |
| Potassium pyrophosphate | 3 |
| Titanium dioxide (rutile) | 220 |
| Calcium metasilicate | 135 |
| Diethyl ether of diethylene glycol | 37 |
| Aqueous emulsion containing 55% by weight of polyvinyl acetate | 350 |
| Aqueous solution of Polysaccharide B-1459, 2% | 51 |

The resulting thickened paint had excellent flow and leveling characteristics when applied by brush or roller.

Example 5

A polyvinyl acetate emulsion paint was prepared that had the same composition as that of Example 4 except that 184 pounds of a 1% aqueous solution of Polysaccharide B-1973 was used as the thickener. The resulting thickened paint had good flow and leveling characteristics when applied by brush or roller.

Example 6

A polyvinyl acetate emulsion paint was prepared that had the same composition as that of Example 4 except that 330 pounds of a 2% aqueous solution of Polysaccharide Y-1401 was used as the thickener. The resulting thickened pair had good flow and leveling characteristics when applied by brush or roller.

Example 7

A polyvinyl acetate emulsion paint was prepared that had the same composition as that of Example 4 except that 10 pounds of Polysaccharide B-1459 was used as the thickener. The resulting thickened paint had excellent flow and leveling characteristics when applied by brush or roller.

Example 8

A polyvinyl acetate emulsion paint was prepared that had the same composition as that of Example 4 except that 8 pounds of Polysaccharide B-1973 was used as the thickener. The resulting thickened paint had good flow and leveling characteristics when applied by brush or roller.

Example 9

A polyvinyl acetate emulsion paint was prepared that had the same composition as that of Example 4 except that 20 pounds of Polysaccharide Y-1401 was used as the thickener. The resulting thickened paint had good flow and leveling characteristics when applied by brush or roller.

The coating compositions of the present invention may be applied to any suitable substrate, whether or not it has been painted previously and whether it is porous or non-porous. Such substrates include wood, plaster, stone, cement blocks, asbestos cement products such as shingles, gypsum board, ceramics, textiles, and the like.

It is to be understood that changes and variations may be made without departing from the spirit and scope of the invention as defined in the appended claims.

What is claimed is:

1. A surface-coating composition comprising an aqueous dispersion containing (a) 10% to 60% by weight of the ammonium salt of a copolymer of approximately 66% by weight of ethyl acrylate, 32.5% by weight of methyl methacrylate, and 1.5% by weight of acrylic acid and (b) approximately 0.1% to 1%, based on the weight of said composition, of a thickener that is a polysaccharide produced by the fermentation of a carbohydrate by an organism selected from the group consisting of bacteria of the genus *Xanthomonas*, bacteria of the genus *Arthrobacter*, and yeasts of the genus *Cryptococcus*.

2. The surface-coating composition of claim 1 wherein the thickener is the polysaccharide produced by the fermentation of glucose by *Xanthomonas campestris*.

3. The surface-coating composition of claim 1 wherein the thickener is a polysaccharide produced by the fermentation of glucose by *Arthrobacter* sp.

4. The surface-coating composition of claim 1 wherein the thickener is a polysaccharide produced by the fermentation of glucose by *Cryptococcus laurentii* var. *flavescens*.

References Cited

UNITED STATES PATENTS

| | | | |
|---|---|---|---|
| 2,956,973 | 10/1960 | Holdsworth | 260—17.4 |
| 3,020,206 | 2/1962 | Patton et al. | 260—209 |

WILLIAM H. SHORT, *Primary Examiner.*

L. P. QUAST, *Assistant Examiner.*

U.S. Cl. X.R.

260—209, 80.0